Patented Mar. 8, 1927.

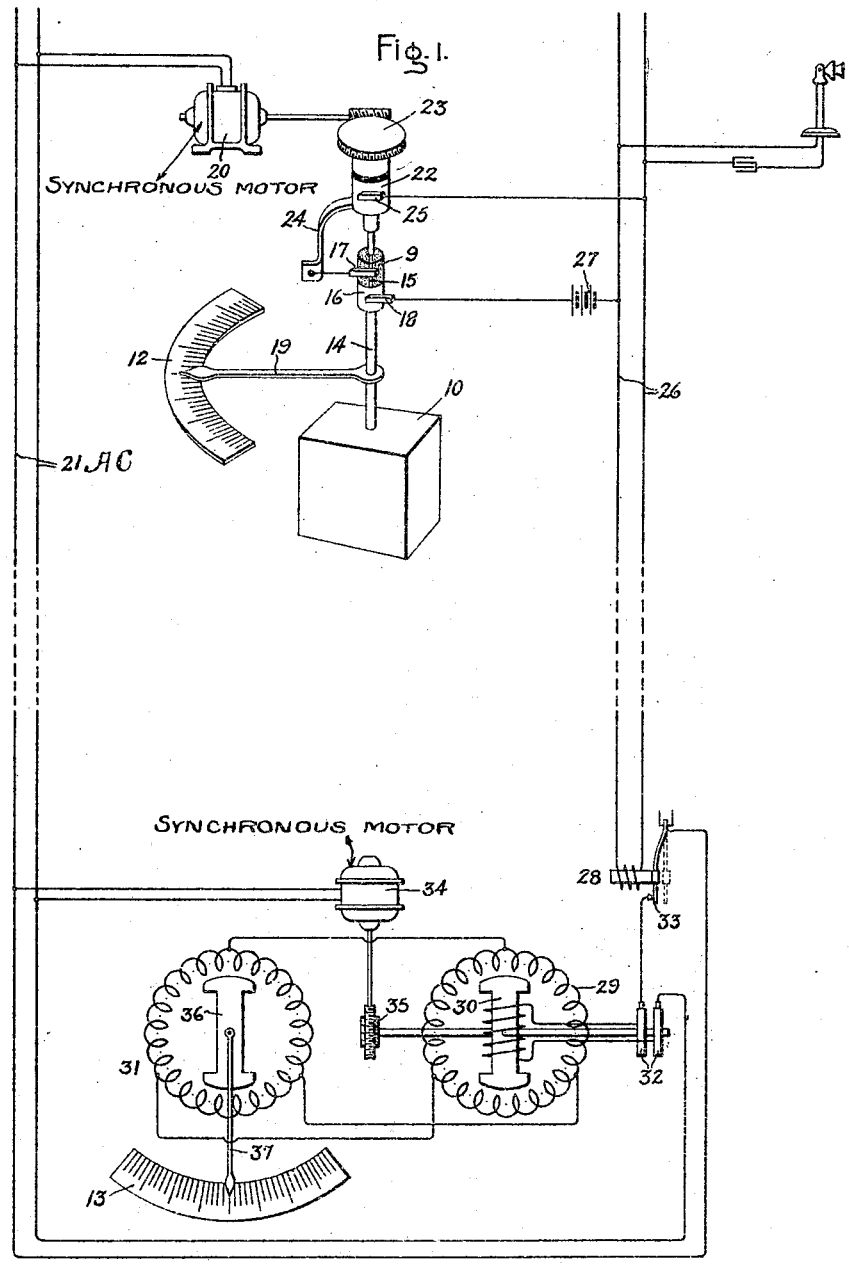

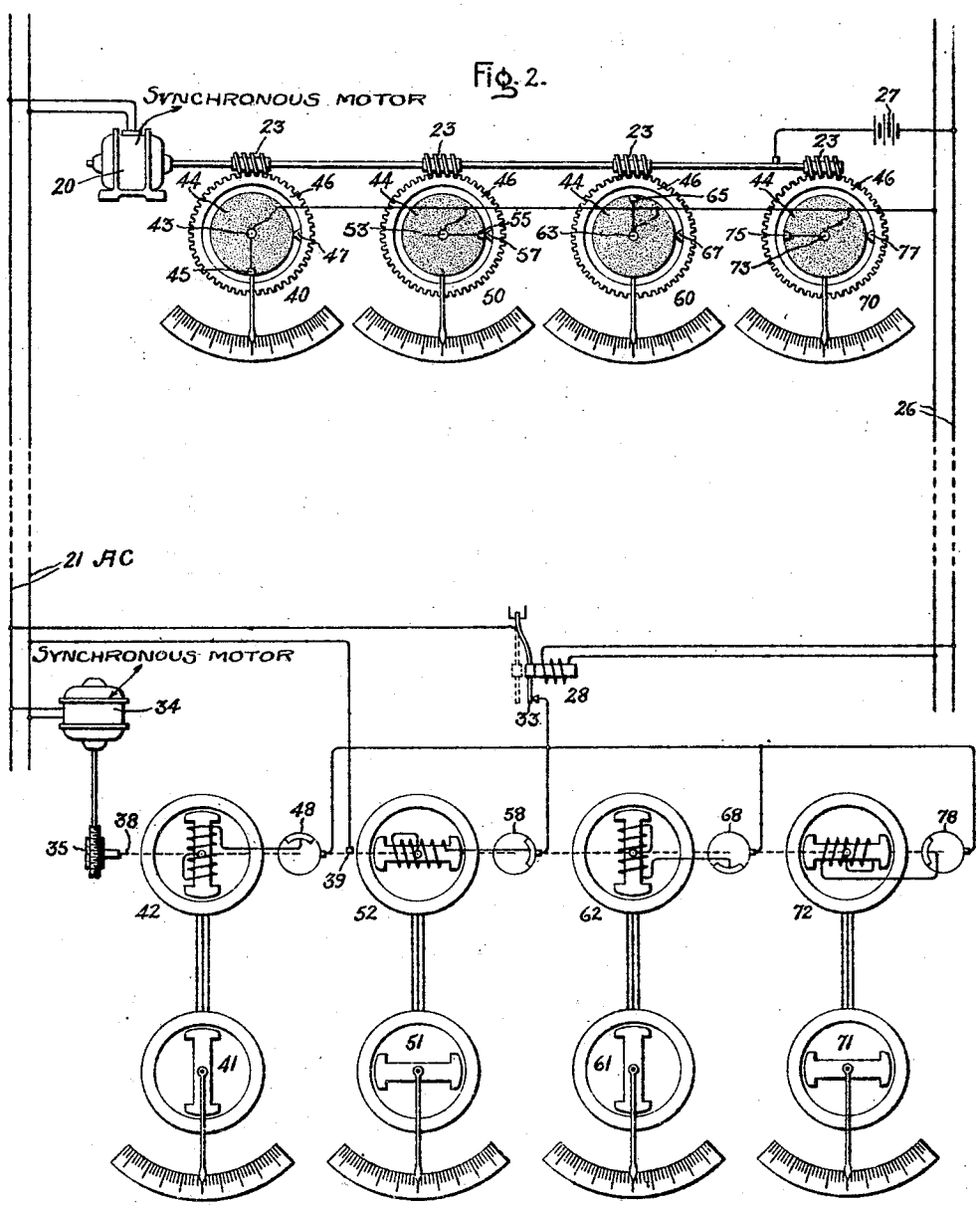

1,620,405

UNITED STATES PATENT OFFICE.

GEORGE W. SPRENGER, OF LYNN, MASSACHUSETTS, ASSIGNOR TO GENERAL ELECTRIC COMPANY, A CORPORATION OF NEW YORK.

TELEMETRIC SYSTEM.

Application filed October 6, 1925. Serial No. 60,886.

My invention relates to an electric impulse system and apparatus for transmitting motion, such for example as the motion of an instrument or meter to a distant point and reproducing such motion in the form of an indication registration or record, as desired.

In general there are two kinds of telemetric systems, namely, those for transmitting continuous movements such as the motion of an integrating meter, and those for transmitting small intermittent movements, such as the movements of an indicating instrument.

One object of my invention is to provide a system applicable for either of these purposes. A further object of my invention is to provide an impulse telemetric system capable of operating over a telephone circuit any distance without interfering with speech. The principle of operation of my invention is based upon the establishment of a rotary synchronous motion relation between the sending and receiving stations and superimposing signalling impulses on this synchronous system such that an impulse produced at the sending station corresponding to a definite rotary position of the synchronous system is reproduced at the receiving station in the same space relation in the form of an indication, or such other form as is desired.

The features of my invention which are believed to be novel and patentable will be pointed out in the claims appended hereto. For a better understanding of the invention, reference is made in the following description to the accompanying drawing in which Fig. 1 represents the essential parts of a modification of my invention as used to transmit instrument indications; and Fig. 2 shows a modification where the indications of several indicators are transmitted without interference.

Referring to Fig. 1, 10 represents an indicating instrument at the sending station, the indications of which are to be reproduced by an indicating device 31 at a receiving station. The scales 12 and 13 of the two indicating devices will be graduated in the same units such as watts, volts, power factor, water level, or whatever the quantity being measured at 10 happens to be.

On the shaft 14 of the measuring device 10 is a commutator 9 having a single narrow segment 15 connected to the continuous slip ring 16. A brush 17 bears upon the commutator and a brush 18 on the ring 16. The rotative position of the segment 15 will correspond to the indication of pointer 19 on scale 12. The brush 17 is arranged to be continuously rotated about the commutator 9 by means of a motor 20 which may be a self starting synchronous motor, such as described in United States Patent #1,546,269, receiving its energy from the alternating current circuit represented at 21. The motor is shown geared to a slip ring 22 through the worm gear 23. The ring 22 is coaxial with the commutator 9 and an arm 24 electrically connects the brush 17 to the slip ring 22. A brush 25 bears upon ring 22 and is electrically connected to one side of a circuit 26 which may be a telephone circuit. The brush 18 is connected to the other side of this circuit and a storage battery 27 is provided to produce a direct current impulse in the circuit whenever the circuit is completed between brush 17 and segment 15. At the receiving station a relay 28 is provided which is included in this circuit and will be energized by the current impulse.

The apparatus at the receiving station for reproducing such impulses in the form of an indication at 13 will now be explained. The receiving apparatus may be considered as comprising a miniature alternating current generator 29 and a miniature alternating current motor 31 supplied from generator 29. The generator 29 has a bi-polar rotor field 30 arranged to have its winding energized through slip rings 32 and a contactor 33 controlled by the relay 28 from any alternating current source of supply such as the circuit 21. The rotor is driven in synchronism with the brush 17 at the sending station by means of a self starting synchronous motor 34 supplied from the circuit 21 and worm geared at 35 to the rotor 30. The stators of motor 31 and of generator 29 in the modification represented have symmetrical distributed windings of any well known form. The rotor 36 of the motor 31 is a bi-polar magnetic structure without windings and is secured to a pointer 37 which cooperates with scale 13.

The operation of the system will now be explained. Since brush 17 and rotor 30 are driven in synchronism, the rotative positions of rotor 30 and brush 17 will always correspond. During each revolution of brush 17, it comes in contact with the narrow segment 15 and energizes relay 28 which closes the circuit of rotor field 30. The speed of rotation of brush 17 and rotor 30 is not important but should be fairly slow, for example 30 R. P. M. Thus we will have 30 impulses per minute. The position of rotor 30 at the moment it is energized will correspond to the position of segment 15 and the indication of pointer 19 on scale 12.

Since the field is energized for only an instant and is rotating slowly, the rotor may be considered stationary at that instant. The single phase alternating flux set up by the field will generate by transformer action a single phase alternating current in the stator 29. The stators of the generator 29 and the motor 31 are connected together in a three-phase relation so that this single phase alternating current will flow in accordance with the position of rotor 30 to produce a corresponding field in motor 31 and the armature 36 which is free to rotate will take a position corresponding to that of rotor 30 at the instant it is energized. Whenever the position of pointer 19 changes, the position of segment 15 will be changed accordingly and the impulse will come at a different position of the rotor 30 which will cause rotor 36 to take up a corresponding position. Thus 30 times per minute, or as often as is desirable, the position of pointer 37 is compared with that of pointer 19 and its position corrected, if necessary. Consequently the pointer 37 will follow the deflections of pointer 19 very accurately. The rotative element of motor 31 will be properly damped so that the movement will be smooth and accurate. This rotative element is suitably balanced so that it remains in any indicating position to which it has been moved after the stator winding is deenergized. As many receiving stations may be operated from the circuit 26 as is desired. The direct current impulses will not interfere with the alternating current telephone currents and the relay 28 will be made non-responsive to such currents. While synchronous motors connected to a common source of alternating current have been specified to maintain the synchronous relation between the sending and receiving stations, I do not wish to be limited thereto but may use any well known means for maintaining the synchronous relation.

It will appear that if the shaft 14 is rotated continuously, for example by an integrating type meter, and the speed of brush 17 is made considerably greater than the maximum speed of rotation of the meter shaft, a corresponding rotative motion will be produced in the instrument 31 at the receiving station. Thus if shaft 14 is rotating 10 R. P. M. and brush 17 is rotating 100 R. P. M. in the same direction, 90 impulses per minute will be produced and each impulse will produce a 40 degree rotation of the rotor of motor 31. The maximum angle of rotation for each impulse should not exceed 90 degrees since the rotor 36 would then reverse its direction of movement each time in order to line up with the nearest line of magnetization. If the direction of rotation of brush 17 is reversed and runs at 100 R. P. M. with shaft 14 running at 10 R. P. M. as before, we would get 110 impulses per minute and the rotor 36 would move through $$\frac{10 \times 360}{110},$$

or $33\frac{1}{3}$ degrees per impulse in the same direction as before. Any change in the speed of rotation of motors 20 and 34 will not affect the accuracy of the system but will only change the number of impulses per minute. Consequently this speed may be anything desired. It will thus be evident that the system is applicable to the transmission of slow reversible indicating movements or continuous rapid integrating movements and the system is sufficiently flexible that it may be adapted to any conceivable telemetric condition.

In Fig. 2 I have represented four indicating devices 40, 50, 60 and 70, at the sending station, and four indicating receivers 41, 51, 61 and 71, at the receiving station with their receiving generators 42, 52, 62 and 72 respectively. Each group such as 40, 41 and 42 comprises the units of a complete system which operates independently of any other group except that one synchronizing system and one relay 28 is used for all groups. For the sake of simplicity and clearness, the illustration is made somewhat diagrammatic. At the sending station is illustrated the indicator shafts 43, 53, 63 and 73. Each indicator has an arc of deflection at 90° and as a consequence it is feasible to assign separate 90° quadrants of the complete operating cycle of 360° to the separate groups. On shaft 43 is an insulating disc 44 having a narrow segment 45. A brush ring 46 carrying the brush 47 is arranged to be rotated through a suitable driving connection by the synchronous motor 20. The sending devices of the other groups are similar with the exception that the commutator segment of each group is progressively displaced 90° with respect to the position of its corresponding brush when the four devices have equal angular deflections. The brushes 47, 57, 67 and 77 are all suitably connected to one side of the circuit 26 through a battery 27 and the various segments 45, 55, 65 and 75 are suitably connected to the other side of circuit 26. The brushes are all driven in a synchronous relation by the motor 20 through gearing 23. At the receiving station the rotors of the four generators are all mounted on a common shaft 38 driven by the synchronous motor 34 through gearing 35. These generators are similar to the generator of Fig. 1 and the motors which they supply with energy are similar to the motor of Fig. 1 and the electrical connections between the generator and motor of each group will be three-phase, as in Fig. 1. The rotor fields of the four generators are supplied from the source 21. One side of the field coils is connected to the shaft 38 upon which a brush 39 bears. This brush is connected to one side of the source 21. The other terminal of the four field coils goes to segmental slip rings 48, 58, 68 and 78 respectively and brushes bearing on these rings connect to the other side of source 21 through the relay operated contact 33. The conducting portions of these rings extend over arcs of 90 degrees and are displaced with respect to each other to the same extent and in the reverse relation as the segments 45, 55, 65 and 75 of the transmitters are displaced with respect to each other. It will thus be evident that during one revolution of the brushes 47 of the transmitter and the shaft 38 of the receiver four impulses will be transmitted and received, one impulse for each group.

Assuming the system to be in operation with the parts in the positions shown, the brush 57 of transmitter 50 is in the operating quadrant and at some part of that quadrant, depending upon the position of the indicator and the segment 55, contact will be made between the brush and segment and an impulse will be sent out from battery 27 to operate the relay 28. The field circuit will be closed at the contactor 33. It will be observed that only the receiving elements 51 and 52 can be affected by this impulse since only the brush ring 58 is in circuit closing position. Thus the indicator 51 will be operated to reproduce the indication at 50 in the manner previously explained. Assuming clockwise rotation of the synchronous system, the next group which will be operated is that comprising elements 40, 41 and 42 which will come into operation some time during the next quadrant of revolution depending upon the position of the segment 45 and its indicator. During the third quadrant, group 70, 71 and 72 will be operated and during the remaining quadrant, group 60, 61 and 62 will be operated. Then the operation will be repeated commencing with group 50, 51 and 52. Thus only one relay, one transmitting circuit and one synchronous system is required to transmit the four indicators which may vary independently of each other. Other combinations and arrangements will occur to those skilled in the art and I do not wish to limit my invention to any particular arrangement but aim to cover in the appended claims all modifications coming fairly within the true scope of my invention.

What I claim as new and desire to secure by Letters Patent of the United States, is:

1. A signalling system comprising a transmitter and a receiver, each having a rotating part, means for establishing a synchronous relation between said parts, a signalling circuit between said transmitter and receiver, movable signalling means associated with said transmitter for closing said circuit once in each revolution of said rotating parts at a point in the revolution depending upon the positions of said signalling means, a position signalling generator having stationary and rotary members at the receiving station, one member of which constitutes the aforesaid rotating part of the receiver, means responsive to the closing of said signalling circuit at the receiving station for momentarily energizing said generator, and position signal receiving means energized by said generator for reproducing movements corresponding to the movements of said signalling means.

2. A signalling system comprising a transmitter and a receiver, each having a rotatable part, means for establishing synchronous rotation of said parts, a signalling circuit, movable signalling means associated with said transmitter for momentarily closing said circuit once in each revolution of the rotatable part of said transmitter depending upon the position of said signalling means, a position signalling generator having stationary and rotary members at the receiving station, one member of which constitutes the aforesaid rotatable part of said receiver, means responsive to the closing of said signalling circuit for momentarily energizing said generator, and a position signal receiving motor energized by said generator for reproducing movements corresponding to the movements of said signalling means.

3. A signalling system comprising a transmitter and a receiver, each having a rotatable part, means for rotating said parts in a synchronous relation, a signalling circuit, movable signalling means associated with said transmitter for momentarily closing said circuit once in each revolution of the rotating part of said transmitter depending upon the position of said signalling means, an alternating current generator having stationary and rotary members at the receiving station one member of which constitutes the aforesaid rotatable part of said receiver, means responsive to the closing of said signalling circuit for momentarily energizing said generator and a synchronous motor energized by said generator for reproducing the movements of said signalling means.

4. A signalling system comprising a transmitter and a receiver, each having a rotatable part, means for establishing synchronous rotation of said parts, a signalling circuit, movable signalling means associated with the rotatable part of said transmitter for closing said circuit once in each revolution of said part depending upon the position of said signalling means, an alternating current generator having stationary and rotary members at the receiving station, one member of which constitutes the aforesaid rotatable part of the receiver, a polar field and field winding for said generator, means responsive to the closing of said signalling circuit for momentarily energizing said winding from an alternating current source, and a synchronous motor energized from said generator for reproducing the movements of said signalling means.

5. In a signalling system comprising sending and receiving devices having rotary parts, means for establishing synchronous rotary movements of said parts, a rotary position indicator associated with said sending device, a signalling circuit, contacts for transmitting current impulses over said circuit for each rotation of the rotary part of said transmitter at a point in its rotary movement, means dependent upon the position of said indicator for determining the rotary position of said point, and means responsive to said current impulses and to the position of the rotary part of said receiving device for generating an alternating flux field at said receiving device along an axis corresponding to the position of said indicator.

6. In a signalling system comprising sending and receiving devices having rotary parts, means for establishing synchronous rotary movement of said parts, a plurality of rotary position indicators associated with said sending device, a signalling circuit, contacts for transmitting current impulses over said circuit for each indicator for each rotation of the rotary parts at points in the rotation, means depending upon the positions of said indicators for determining the rotary positions of said points, and means associated with the receiving device responsive to such current impulses and to the position of the rotary part of said receiving device for generating alternating flux fields along axes corresponding to the respective positions of said plurality of indicators.

7. A signalling system comprising a plurality of transmitters, a receiver for each transmitter, said transmitters and receivers having rotary parts, means for establishing synchronous rotation of all of said rotary parts, a signalling circuit, independently movable signalling means associated with each transmitter for closing said circuit once during each revolution and at given points of the rotary parts of said transmitters, depending upon the positions of said signalling means, signal reproducing means associated with the rotary parts of each receiver operative in response to the closing of said signalling circuit, and means operated by the synchronously rotating parts of said receivers for allowing only that reproducing means corresponding to the transmitter closing the signalling circuit to be operated in response to such closure.

8. A signalling system comprising sending and receiving devices having rotary parts, means for establishing synchronous rotary movement of said parts, a plurality of rotary position indicators associated with said sending device, a signalling circuit, contacts arranged to transmit current impulses over said circuit for each indicator at different times in succession for each revolution of said rotary parts at points in the revolution depending upon the various positions of said indicators, a plurality of position signalling generators at the receiving station, the aforesaid rotary parts of said receiving device constituting the rotary parts of said generators, means operated in synchronism with said rotary parts for energizing said generators in succession in response to the successive current impulses, and position signal receiving means energized by said generators for respectively reproducing the indications of said position indicators.

In witness whereof I have hereunto set my hand this 2nd day of October, 1925.

GEORGE W. SPRENGER.